Feb. 4, 1936. J. H. HAMMON 2,029,480
MULTIFOCAL OPHTHALMIC LENS AND BLANK THEREFOR
Original Filed May 31, 1933    3 Sheets-Sheet 1
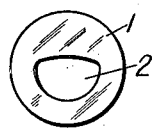 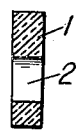  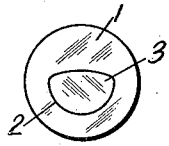 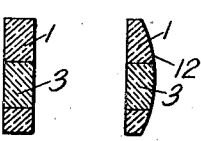 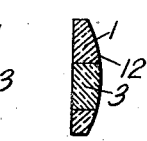
Fig. 1   Fig. 2   Fig. 3   Fig. 4   Fig. 5   Fig. 6
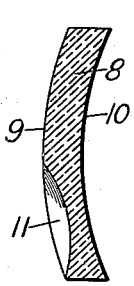 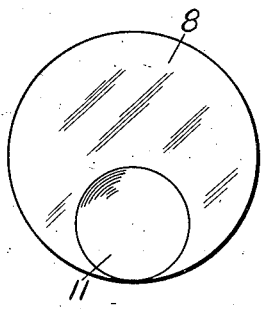 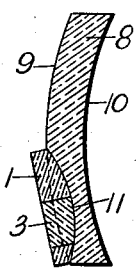 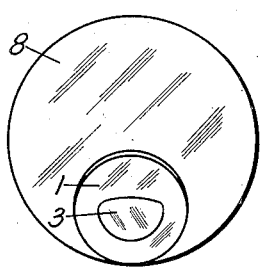
Fig. 7   Fig. 8   Fig. 9   Fig. 10
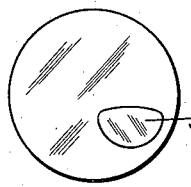 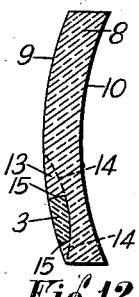  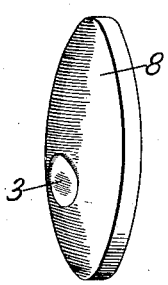 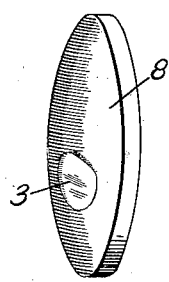
Fig. 11   Fig. 12   Fig. 13   Fig. 14   Fig. 15
 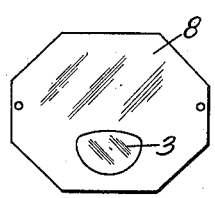 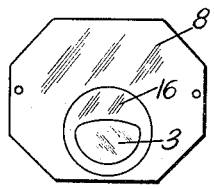
Fig. 16   Fig. 17   Fig. 18
INVENTOR.
James H. Hammon
BY
ATTORNEYS.

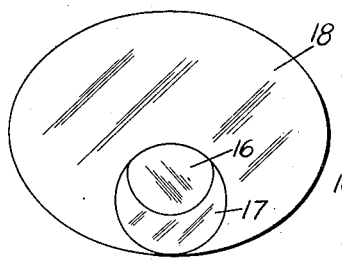
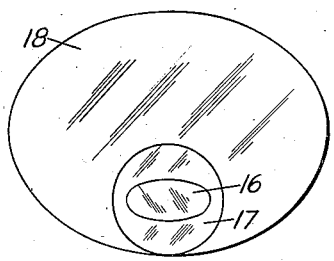
Fig. 19  Fig. 20  Fig. 21  Fig. 22
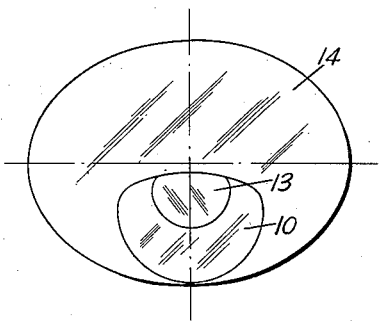
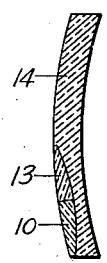
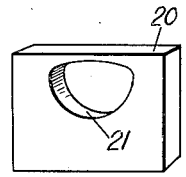
Fig. 23  Fig. 24  Fig. 25
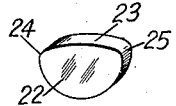
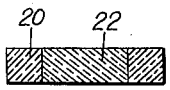
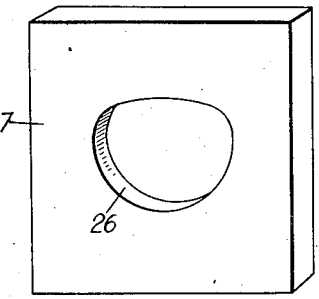
Fig. 26  Fig. 27  Fig. 28
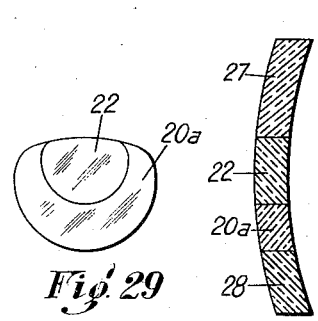
Fig. 29  Fig. 30
INVENTOR.
James H. Hammon
BY
ATTORNEYS.

Feb. 4, 1936.  J. H. HAMMON  2,029,480
MULTIFOCAL OPHTHALMIC LENS AND BLANK THEREFOR
Original Filed May 31, 1933   3 Sheets-Sheet 3

INVENTOR.
James H. Hammon
BY
ATTORNEYS.

Patented Feb. 4, 1936

2,029,480

UNITED STATES PATENT OFFICE 2,029,480

MULTIFOCAL OPHTHALMIC LENS AND BLANK THEREFOR

James H. Hammon, Vincennes, Ind.

Original application May 31, 1933, Serial No. 673,708. Divided and this application March 27, 1934, Serial No. 717,632

4 Claims. (Cl. 88—54)

My invention relates to multifocal ophthalmic lenses and blanks therefor. It has to do particularly with the provision of a novel type of lens and lens blank which permits of the production of bifocal, trifocal and other multifocal lenses more completely adequate to the correction of defective vision.

In the making of multifocal ophthalmic lenses and, particularly in the making of bifocal and trifocal lenses, there are several factors of importance which should be taken into consideration. Chief among these factors are the prismatic effects of the various portions of the lenses and the shapes of such portions both individually and in relation to each other.

With respect to the prismatic effects of the various portions of multifocal ophthalmic lenses, there are several aspects which are particularly important. For one thing, little consideration has been hitherto given to the question of the proper location of the optical centers of reading portions and intermediate vision portions of multifocal ophthalmic lenses and little has been done to insure the attainment of such proper location.

Many prior art multifocal lenses apparently overlook the fact that the relative position of the eyes in reading is markedly different from their position in distance vision and that a somewhat similar difference exists between the position of the eyes in intermediate vision in comparison with their position in distance vision or in reading. Thus, in reading through a single vision lens, the eye naturally move away from the optical center of the lens, as the lines of vision converge, to obtain a reading focus. One result of this is that the vision in reading is through prismatic portions of the lenses and little or no attempt has been made to provide reading segments whose prism bases are properly located to compensate for the prismatic effect of the main lens and, in cooperation therewith, to produce a net correction that will be fully effective.

With respect to the question of the shapes of the various portions of multifocal lenses, most prior art multifocal lenses have been so made that they automatically present difficulties to the provision of the proper shapes of the reading segment portion, the intermediate vision segment portion and the distance portion of the lenses, this being particularly true in fused multifocal lenses. For example, the common use of the so-called edge-to-edge fusing method has more or less dictated the making of straight dividing lines between the reading segment portion and the distance vision portion. This is true to an even greater extent in the making of trifocal lenses and little success has been had in the marketing of such trifocal lenses. Partly because of manufacturing difficulties and partly because of lack of perception, the art has more or less turned its back upon certain shapes of reading portions and intermediate vision portions which are particularly suitable for the average user of bifocal and trifocal lenses.

One of the objects of this invention is to provide a fused multifocal ophthalmic lens wherein a reading segment of prismatic form and of prescribed prismatic effect may have its base disposed according to prescription in order that proper correction may be effected both by the amount of prism introduced and by the proper location of the base of the prism constituting such reading portion. It is also the object of this invention to provide for similar correction in the intermediate vision portion. In other words, one object of my invention is to provide for the incorporation in an ophthalmic lens of a fused prism segment of proper prismatic strength and with the prism base directed towards any point with relation to the optical center of the distance vision portion, depending upon the correction required by the particular eye being fitted.

Another object of this invention is to provide a fused multifocal ophthalmic lens wherein the reading segment portion is of a novel shape particularly suitable to the functions performed by this portion. If the multifocal ophthalmic lens takes the form of a trifocal, it is one of the objects of this invention to provide a distance vision portion, a reading segment portion and an intermediate vision portion, all of which are so shaped and located with relation to each other as to insure a maximum utility in the performance of the function for which they are particularly designed.

Various other objects of this invention will appear as this description progresses.

In its preferred form, my invention contemplates the provision of a main lens blank of concavo-convex form of uniform thickness having a spherical countersink in the convex surface thereof. In conjunction with this main lens blank, I preferably provide a composite button whose outer edge is circular and which is of substantially the same diameter as the spherical countersink in the main lens blank. If a bifocal lens is to be produced, the composite button comprises an exterior carrier portion formed of glass of the same index of refraction as the main lens blank and an interior reading segment button of a different index of refraction than the main lens blank.

If a trifocal lens is to be produced, the composite button comprises an interior segment button formed of material having an index of refraction different from that of the main lens blank. This reading segment button may be surrounded or partially surrounded by an intermediate vision segment which is of a different index of refraction from both the reading segment button and the main lens blank. It may constitute the carrier button or it may, in turn, be carried within a carrier button of the same index of refraction as the main lens blank.

This application is a division of my copending application, Serial No. 673,708, filed May 31, 1933, which, in turn, is a continuation in part of my applications, Serial No. 503,627, filed December 20, 1930, Serial No. 505,807, filed December 31, 1930 and Serial No. 619,365, filed June 27, 1932, the latter being a continuation in part of my application filed December 18, 1930, Serial No. 503,127.

The preferred embodiments of my invention are shown in the accompanying drawings wherein similar characters of reference designate corresponding parts and wherein:

Figure 1 is a plan view of a carrier button which I preferably utilize in the forming of an unfinished lens blank to be used in the production of my bifocal lens.

Figure 2 is a vertical sectional view of the carrier button shown in Figure 1.

Figure 3 is a perspective view of the reading button before it is placed in the perforation provided in the carrier button.

Figure 4 is a plan view of my composite button which embodies the carrier button and the reading segment button carried in the perforation thereof.

Figure 5 is a vertical sectional view of the composite button shown in Figure 4.

Figure 6 is a vertical sectional view of my composite button with a surface thereof ground and polished to a curvature substantially the same as the curvature of the countersink into which the composite button is to be placed.

Figure 7 is a vertical sectional view of a major blank portion with a countersink formed therein for the reception of the composite button.

Figure 8 is a plan view of that side of the major blank portion which has the countersink formed therein.

Figure 9 is a vertical sectional view of an unfinished lens blank, showing my composite button mounted in the countersink of the major blank portion.

Figure 10 is a plan view of my unfinished lens blank showing that side thereof which carries the composite button, with the composite button mounted therein.

Figure 11 is a plan view of a carrier button and reading segment carried thereby wherein the geometrical center of the reading segment portion is located to one side of the geometrical center of the carrier button and, therefore, to one side of the geometrical center of the countersink.

Figure 12 is a vertical sectional view of a semifinished lens blank.

Figure 13 is a vertical sectional view substantially identical with Figure 12, except that the cross hatching is applied only to the reading segment in order to distinguish it from the carrier button and the major blank portion and that the lens blank has been finished by removal of the portion represented by the broken lines.

Figure 14 is a perspective view of a finished lens blank made in accordance with my process and with the optical center of the reading segment so located as to produce a "no-jump" bifocal in accordance with the steps illustrated in Figures 1 to 10, inclusive.

Figure 15 is a perspective view of a finished lens blank made in accordance with my invention and with the optical center of the reading segment located above the upper left hand corner of such segment, a result which may be obtained by locating the reading segment button eccentrically in the carrier button, as illustrated in Figure 11.

Figure 16 is a plan view showing a preferred contour of my reading segment.

Figure 17 is a plan view of a finished bifocal lens made in accordance with my invention.

Figure 18 is a plan view of a finished trifocal lens made in accordance with my invention.

Figure 19 is a plan view of a lens made in accordance with the above described method and embodying a reading segment partially enclosed within an intermediate vision portion.

Figure 20 is a vertical transverse section taken through the lens shown in Figure 19.

Figure 21 is a plan view of a lens embodying a reading segment portion enclosed within an intermediate vision portion.

Figure 22 is a vertical transverse section taken through the lens shown in Figure 21.

Figure 23 is a plan view of a modified form of trifocal lens wherein the intermediate vision portion embraces the reading segment and extends for substantial distances on both sides thereof while the upper edges of both portions form parts of a continuous line.

Figure 24 is a fragmentary vertical transverse section taken through the lens of Figure 23 and enlarged to illustrate that both the reading segment and the intermediate vision segment have substantial depth at all points throughout their areas.

Figure 25 is a perspective view of a carrier button for the reading segment of the lens shown in Figure 23.

Figure 26 is a perspective view of the reading segment button for the making of the lens shown in Figure 23.

Figure 27 is a sectional view of a composite button which comprises the reading segment button and a carrier button which is made of a glass of a different index of refraction from both the reading segment button and the distance vision portion of the lens for the making of the lens shown in Figure 23.

Figure 28 is a perspective view of a carrier button which has been perforated for the reception of a composite button to be formed from the composite blank of Figure 27.

Figure 29 is a plan view of the composite button which has been formed from the blank of Figure 27 and which is to be introduced into the perforation in the carrier button shown in Figure 28.

Figure 30 is a vertical sectional view of the composite button embodying the carrier button of Figure 28 and the composite button of Figure 29, with one surface thereof made convex to approximate a spherical countersink to be provided in the main lens blank for the reception thereof.

Figure 31:
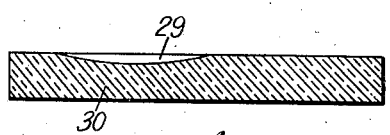
Figure 31 is a sectional view of a main lens blank, taken through the spherical countersink provided therein.
Figure 32:
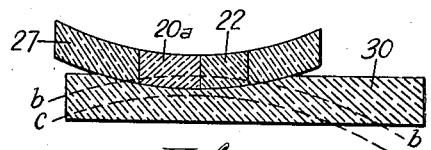
Figure 32 is a sectional view illustrating the composite blank of Figure 30 mounted in the spherical countersink in the blank of Figure 31.
Figure 33:
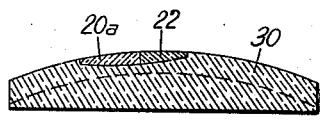
Figure 33 is a sectional view of a semifinished blank formed from the structure shown in Figure 32.
Figure 34:
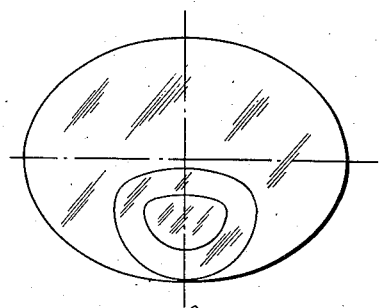
Figure 34 is a plan view of a trifocal lens with a further modified form of reading segment and intermediate vision segment.
Figure 35:
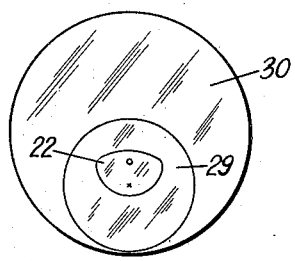
Figure 35 is a plan view of an unfinished bifocal lens blank made in accordance with my invention and showing the reading segment button so located within its carrier button that the deepest portion of the countersink is beneath a point adjacent the lower edge of the reading segment button which places the optical center of the reading segment at this point.

Referring more particularly to Figures 1 to 3, of the drawings, it will be seen that I provide a circular carrier button 1 with a perforation extending therethrough, as at 2. Under preferred conditions, the perforation in my carrier button is produced by punching while the glass is hot and of a viscosity which will render this feasible. This method is more economical than cutting or grinding the perforation, though cutting or grinding may be resorted to if desired. The reading segment button 3 may be secured in the perforation of the carrier button in various ways, but it is preferably secured therein by fusion.

Also, I may construct the carrier button with a hole or socket in its face which does not extend entirely through the carrier button and which is of a form to receive the reading segment button. This may also be accomplished by the punching of the glass carrier button while hot and, of course, the punch and the hole formed thereby may be of any desired contour. The reading segment button is preferably mounted in this socket by fusion.

The major portion of the unfinished blank 8 (Figure 7) is formed of a glass of a different index of refraction from that of the reading segment button and is preferably provided with a convex surface 9 and a concave surface 10, so disposed relatively that the blank has an edge of uniform thickness. The convex surface 9 of this blank is provided with a spherical countersink 11 which is of larger diameter, hence of greater depth than has been customary in the prior art. Furthermore, it is of a selected and known curvature and of substantially the area of the carrier button. It is positioned in relation to the geometrical center of the blank as described.

After the reading segment button has been positioned in the carrier button, I provide on one side thereof a suitable surface 12 (Figure 6) preparatory to fusing the composite button into the spherical countersink. The said suitable surface is formed on a side of the composite button which contains an exposed end of the reading segment button. The fusing of the properly surfaced composite button into the spherical countersink, as shown in Figures 9 and 10, finally fixes and determines the curvature of the submerged or inner surface of the reading segment button in coincidence with the curvature of the countersink.

The depth of the spherical countersink may be such that after the composite button is fused therein and its outer surface ground into coincidence with the convex surface 9 of the major lens blank, the reading segment button will remain intact as to area and will have a thickness throughout. In other words, the composite button may be embedded in the convex surface of the unfinished blank to such an extent that the grinding of the outer surface of the composite button into coincidence with said convex surface will still leave a reading segment button of undiminished area and of a thickness at all points that will permit further grinding to permit location of the optical center of the reading segment at any desired point, as will be more clearly explained hereinafter.

One important characteristic of my blank and the various parts which enter into the construction thereof is that it makes possible the location of the optical center of the reading portion at any point with relation to the geometrical center thereof. This controls the amount and direction of the prism element and may be accomplished in several ways.

In preparing the blank for the fusing of the composite button into the spherical countersink, I preferably construct and place the composite button so that the circular periphery thereof coincides with the circular edge of the countersink. This forms an easy method of locating the center of the composite button in coincidence with the center of the countersink. If the composite button is then ground down until its outer surface is in coincidence with, and a continuation of the convex surface 9 of the blank, the optical center of the reading segment will be at the center of the countersink. Consequently, if the perforation is made as in Figure 1, the optical center of the reading segment will be slightly below the top arched dividing line and midway thereof, while if it is displaced as in Figure 11 the optical center will be outside the reading segment altogether, namely, to the left and above the reading segment.

The fusing of the composite button into the countersink of the major portion of the blank brings about a complete union between the carrier button and the major portion of the blank, so that the portions 13 (Figure 12) of the carrier button become an integral part of the major blank and so that the junction lines indicated by the dotted lines 14, as shown in Figure 13, disappear. This leaves the reading segment button embedded in the convex side of the major blank portion to a substantial extent at all points in the area thereof but of a somewhat undesirable thickness, owing to the fact that the peripheral wall 15 of this reading segment button is of undesirable height and prominence.

My method therefore preferably contemplates the continued grinding of the convex surface 9, while maintaining the edges of the blank of uniform thickness throughout, until the conditions represented by Figure 13 are obtained. In this condition, the finished lens blank has been produced and is ready for the final grinding operations upon the concave side 10 of the blank, for the purpose of completing the prescription of the distance portion of the lens.

I may, however, determine the location of the optical center of the reading segment during the course of the grinding of the convex surface 9 to final form by varying the axis of rotation of the grinding tool with relation to the surface of the main blank. Thus, I may bring about the decentering of the reading segment by the eccentric location of the reading segment button in the carrier button or by the final grinding operation upon the convex surface of the lens blank or by a combination of both methods.

In the application of my invention to a trifocal lens, I may utilize several types of structure. One type is illustrated in Figures 19 to 22, inclusive. In this type, the reading segment portion is mounted in a carrier button, as in the case of the bifocal just described.

However, in the making of a trifocal lens as illustrated in these figures, the reading segment portion 16 is carried within a carrier button 17 which is formed of glass having an index of refraction that is different from the index of refraction of the glass of the distance vision portion 18 and also different from the index of refraction of the glass forming the reading portion 16. The method of constructing the lens blank is substantially identical with the method shown and described in Figures 1 to 12, inclusive, except that the carrier button is of a different index of refraction from the index of refraction of the reading segment button. Briefly stated, the reading segment button is mounted in its carrier button and both are provided with a convex surface approximating the contour of a spherical countersink which is provided in a major lens blank of concavo-convex form.

As illustrated in Figures 19 and 21, the location of the reading segment button within the carrier button may vary. In consequence of this, the shape of the intermediate vision portion and its location in relation to the reading segment portion may vary and, also, the shape of the reading portion may vary.

Thus, as illustrated in Figure 19, the combined reading and intermediate vision portions may, together, form a complete circle with the reading portion forming the upper part of the circle and the intermediate vision portion forming an embracing crescent extending well up on both sides of the reading portion. On the other hand, as illustrated in Figure 21, the reading portion may be entirely disposed within the intermediate vision portion, so that a substantial area of the intermediate vision portion entirely surrounds the reading portion. In this connection, it may be noted that the reading portion is of a different shape than the reading portion shown in Figure 19. As illustrated in Figures 21 and 22, the edge of the composite button is sharply formed and this button may be further decreased in area by continued grinding of the convex surface of the lens without altering the area of the inner minor portion.

The further modification of my invention is illustrated in Figures 23 to 34, inclusive. In these figures, it will be noted that the intermediate vision segment is so shaped with relation to the reading segment that, in the finished lens (Figure 23) the intermediate vision portion provides a substantial area for intermediate vision on both sides of the reading portion and extending upwardly substantially to the top line of such reading portion. It will further be noted that the tops of both the reading portion and the intermediate vision portion take the form of low flat arches which are joined to the sides of such portion by small arcs. This is rendered possible by a modified blank structure which is now to be described and which also makes possible a more complete control of the location of the optical center of the intermediate vision portion in addition to the control of the location of the optical center of the reading segment portion.

In making the lens blank in accordance with this modified form of my invention, I utilize an intermediate vision portion 20 (see Figure 25) which is provided with an aperture 21 and which is of a different index of refraction from the reading segment button to be disposed in such aperture and also from the major blank portion to be subsequently described. The reading segment button may be designated 22 and is shown in Figure 26 as resembling the lower half of a circle in area with a low flat arched top 23 joined to the lower sides of the segment by short arcs 24 and 25. This reading segment portion is disposed within the aperture 21 and is preferably fused therein. After it has been so positioned in the member 20, a composite button is formed from this member by cutting or grinding and the preferred shape of this composite button is illustrated in Figure 29 of the drawings wherein the reading segment portion is designated 22 and the intermediate vision segment is designated 20a. This composite button is thereupon fitted and fused into an aperture 26 which is formed in a blank 27 (Figure 28) having an index of refraction identical with the index of refraction of the major lens blank to be described.

The blank thus formed is illustrated in Figure 30 in the condition assumed after its lower surface has been ground to a convex curvature 28 so that it will fit into a spherical countersink 29 of a major lens blank 30 (Figure 31). It is then fused into this countersink of the major lens blank to form the semifinished lens blank illustrated in Figure 32. The upper surface of this semifinished blank may then be ground to convex form, for example, to the curvature indicated by the dotted line b—b. Its under surface may then be ground to concave form, for example, to the curvature indicated by line c—c.

During the fusion of the carrier button 27 and the composite button contained therein to the major lens blank, the lower surface of the composite button takes the curve of the countersink and the carrier button merges with the major lens blank so that the line of demarcation therebetween disappears. Furthermore, the depth of the spherical countersink is such and the selected curvature b—b is preferably such that both the reading segment button and the intermediate vision segment button retain their areas unchanged.

It will be seen from the above that I have provided a composite structure whose disassembled parts are of such a nature and so related to each other that I am able to produce a multifocal lens wherein the minor lens portions are prismatic and wherein the base of at least one of these prisms may be located in any direction with relation to the center of the finished major lens portion. More specifically, by locating the minor lens segments within a carrier button which fits within a spherical countersink in the major lens blank, I may so position the minor lens segments in such spherical countersink that the optical center of at least one of such minor segments will be at any selected point either within or outside of such segment.

Figure 36:
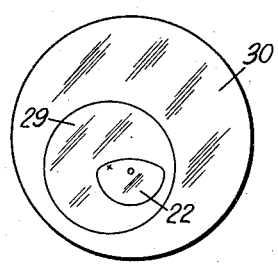
Figure 36 is a plan view of an unfinished bifocal lens blank made in accordance with my invention wherein the reading segment button is so located within the carrier button that the optical center of the reading segment will fall adjacent the upper left hand corner thereof.
Figure 37:
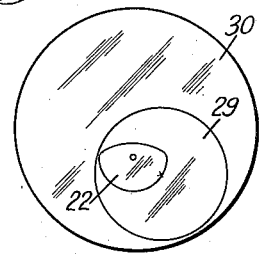
Figure 37 is a plan view of an unfinished bifocal lens blank made in accordance with my invention wherein the reading segment button is so located within the carrier button that the optical center of the reading segment will fall within the area thereof but adjacent its lower right hand corner.
Figure 38:
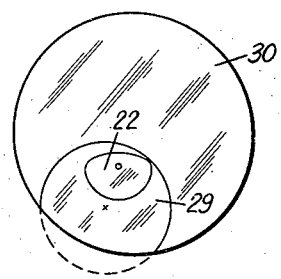
Figure 38 is a plan view of an unfinished bifocal lens blank made in accordance with my invention wherein the reading segment button is so located within the carrier button that the optical center thereof will fall outside of the area thereof on its lower left hand side.

The manner in which this can be effected in making bifocal lenses is illustrated in Figures 35 to 38, inclusive. Thus, in Figure 35, the major lens blank 30 is shown with its countersink 29 and the reading segment button is diagrammatically illustrated at 22. The center of curvature of the lower edge of this reading segment is designated O but the optical center is located at X, which is that point directly above the center or deepest point of the spherical countersink. In Figure 36, the parts are similarly designated but it will be noted that the optical center of the reading segment X lies outside of the leading segment, being designated X and being the center and deepest point of the spherical countersink. In Figure 37, the parts are similarly designated and it will be noted that the optical center of the reading segment, designated X, is within the area of the reading segment but at the lower right hand side thereof, since this is the point directly above the center and deepest point of the spherical countersink. In Figure 38, the parts are similarly designated but the optical center of the reading segment, designated X, is located outside of such segment adjacent the lower left hand side thereof and being the center and deepest point of the spherical countersink. By the arrangements indicated, the reading segment will always have a fixed position in the major lens blank while the varying positions of the spherical countersinks therein and the consequently varying relations of the reading segment to the center of such countersink will result in varying locations of the optical centers of the different reading segments or of the value of the prism contained within the reading segment.

Reading segments of prismatic form with their optical centers differently located are illustrated in Figures 14 and 15 of the drawings. Thus, in Figure 14, the reading segment is shown with its prism base up and substantially in the center thereof, as would occur in uniform grinding with the reading segment button located as in Figure 1. In Figure 15, the reading segment is shown with the prism base in and up, that is, with the optical center of the reading segment above the upper left hand corner thereof, as would result from uniform grinding of the convex surface with the reading segment button positioned as in Figure 11.

The importance of this structure for the making of bifocal lenses will be immediately recognized. It provides bifocal lenses with reading segments in the form of prisms which may be disposed "base-in", "base-out" or at various other positions in the lens structure. The construction of my unfinished lens blank and the parts which enter into the making of it offer simple means for obtaining a great variety of arrangements of the reading segments to satisfy various prescription requirements.

In the making of a trifocal lens, whether it be made in accordance with the principles of blank construction illustrated in Figures 19 to 22, inclusive, or in accordance with the principles illustrated in Figures 23 to 34, inclusive, the optical center of a minor segment may be selectively located as desired. Thus, it may be located adjacent the dividing line between the distance vision portion and the reading portion or it may be located adjacent the dividing line between the reading portion and the intermediate vision portion.

Furthermore, in the making of a trifocal lens in accordance with the principles illustrated, the carrier button, whether it be of the type to ultimately become the intermediate vision segment as in Figures 19 to 22 or whether it be of the same index of refraction as the major lens blank as shown in Figures 23 to 33, serves as a filler immediately within the periphery of the spherical countersink and insures that a central segment button will always be surrounded with a definite wall of glass of a different index of refraction. Moreover, in the unfinished lens blank, this wall of glass may be of sufficient height to permit grinding of the reading segment with the surrounding surfaces to any extent necessary to produce any desired prism in the reading segment while still maintaining this reading segment in its initial shape and area. This may be insured by predetermining the size of the countersink.

In the blank construction illustrated in Figures 25 to 32, additional advantages accrue from the fact that the carrier button is distinct from the intermediate vision segment button. One of these advantages arises from the fact that the outer periphery of this intermediate vision segment is independent of the outer periphery of the spherical countersink. In other words, the carrier button provides filler glass of the same index of refraction as the major lens blank and may be provided with an aperture of any shape to receive the composite reading and intermediate vision segment buttons.

Figure 39:
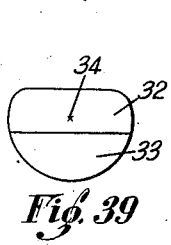
Figure 39 is a plan view of a modified form of composite button which I may use in the making of a trifocal lens.
Figure 40:
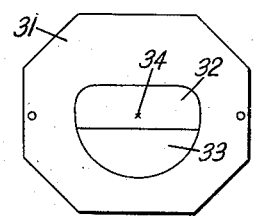
Figure 40 is a plan view of a trifocal lens having an intermediate vision portion and a reading portion made by the use of the composite button illustrated in Figure 39.
Figure 41:
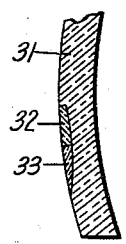
Figure 41 is a sectional view taken through a portion of the lens of Figure 40 so as to show a cross section of the intermediate vision segment and the reading segment.

The modification illustrated in Figures 39, 40 and 41 possesses numerous important advantages. In the first place, the distance field 31 occupies the major portion of the lens, being located above the intermediate and reading segments and also extending around the sides and bottom thereof. Thus, an object at a distance may be readily observed through the upper portion of the lens and through the sides thereof while objects on the floor or ground may be readily observed through the lower portion of the distance field.

The intermediate vision portion 32 and the reading portion 33 are preferably so formed that the optical center is located as at 34. In this position, it is near the dividing line between these two segments, so that the eye in passing across this dividing line is not annoyed by the apparent jumping of the image. On the other hand, this optical center is, due to the relatively flat upper edge of the intermediate portion, also located near the upper dividing line between the intermediate vision portion and the distance portion of the lens. This also precludes any material jump of the image as the eye passes across this upper dividing line.

Another advantageous feature of this type of trifocal lens arises from the fact that the intermediate field of vision permits a broad lateral range of vision so that the wearer may readily observe a comparatively broad expanse of desk, work bench or other surface. At the same time, the reading segment has an upper edge which is amply wide to permit adequate vision laterally in all movements of the eye normally used in reading.

The structure of the blank from which the lens is made permits of the incorporation of additional prism powers in the reading and intermediate vision segments. Likewise, the bases of these prisms may be located in any prescribed relation to the geometrical center of the lens.

Because it is possible to provide in this carrier button an aperture of any selected shape for the reception of the composite reading and intermediate vision segment button, these segment buttons may be made of shapes not hitherto attainable economically in fused trifocal lenses. For example, an intermediate vision segment of the shape shown in Figure 7 has not hitherto been attainable by the types of unfinished lens blanks found in the prior art. This has particularly been due to the necessity for having the glass surrounding the reading segment button of circular form at the outer periphery of the spherical countersink. This factor has also placed a limitation upon the variation in shape of the reading segment button. But with my described blank structure, practically any shape of reading segment and intermediate vision segment is attainable in a trifocal lens blank and lens in a practicable and economical way.

Another advantageous feature of my invention arises from the fact that in the preferred form, the lower portion of the reading segment button approximates a half circle. One result of this is that the operator, in performing the grinding operation, need only observe the bounding wall from time to time to be sure that its depth is being progressively diminished to an equal extent all around where the optical center of the reading segment is located an equal distance from all points of the boundary wall or that it is being progressively diminished to the proper relative extents all around where the optical center of the reading segment is otherwise located. A similar advantage exists with respect to a trifocal where a substantial portion of any intermediate vision segment has a partially circular edge.

A still further advantage of my lens construction is that it embodies a reading segment, and in some cases an intermediate vision segment having a wide visual area of substantial height along the upper edge thereof whose lateral bounding walls take the form of arcs which approximate the radius of the pupil and which join the semicircular parts of the segments to the comparatively low arches that form the tops thereof, one or both segments corresponding substantially to the perimetrical fields of vision, as illustrated in Figure 16. These low arches and the arcs which connect them to the semicircular portions of the segments reduce undesirable reflections to a minimum. Likewise, sharp upper corners of the segments, rendered practically necessary by previous blank constructions, which are inefficient as portions of fields of vision and which subtract from the areas of the distance fields are entirely dispensed with by the use of our blank construction and by the shapes of segments indicated.

It should be noted however, that the fact that the reading segment has substantial thickness at its edge does more than render possible the positioning of the optical center of the reading segment at any place. It makes possible the further grinding of the reading segment so as to reduce its initial contour, size and shape with or without altering the previously determined location of its optical center. This further grinding may be resorted to for the purpose of eliminating a part of the wall or to decrease the size of the segment and when this is done to the extent that the resultant edge has no thickness, that portion of the periphery of the segment will be a part of a circle.

Another advantage of my invention consists in the fact that it makes possible the construction of a trifocal lens wherein an intermediate field of vision surrounds or substantially surrounds the reading segment and is concentric or eccentric with relation thereto. Thus, it is possible to construct a trifocal lens wherein the reading field is of the shape shown at 3 in Figure 16 and is surrounded with an intermediate field of the form shown in 16; or wherein various other forms of reading and intermediate fields, such as shown in Figures 19, 21, 23 and 34 may be provided by simple and economical operations.

Throughout this specification, I have used the terms reading portion, intermediate vision portion and distance vision portion to indicate portions of different focal powers especially fitting them for their specific uses. It will be understood, however, that these various portions are not limited to those positions in the lens at which I have shown them. They are interchangeable as to location without departing from the spirit of my invention. Thus, the reading portion may surround or embrace or be above the intermediate vision portion or vice versa as desired. Likewise, the major lenticular area which I have termed the distance portion may be the reading portion with the distance portion replacing the reading portion as to location. Changes such as these are within the scope of my invention.

Various other advantages of my invention will appear from the appended claims.

Having thus described my invention, what I claim is:

1. A fused trifocal lens blank comprising a main blank portion of one index of refraction having a countersink of a single curvature therein, and a composite button comprising an exterior carrier portion formed of glass of a second index of refraction, and a segment of glass of a third index of refraction embedded in said carrier portion so as to provide a shoulder therearound, said button having a complemental single curvature on one of its surfaces throughout its entire area and being fused to said countersink in a position such that the portion of the surface of single curvature corresponding to said segment is located at a predetermined fixed point with respect to the center and deepest point of said countersink to thereby produce the desired prism in the segment vision field in the finished lens without changing the shape and area of said segment field.

2. A fused trifocal lens blank comprising a main blank portion of one index of refraction having a countersink of a single curvature therein, and a composite button comprising an exterior carrier portion formed of glass of a second index of refraction, and a segment of glass of a third index of refraction embedded in said carrier portion so as to provide a shoulder therearound, said button having a complemental single curvature on one of its surfaces throughout its entire area and being fused to said countersink in a position such that the portions of the surface of single curvature corresponding to said segment is located at a predetermined fixed point with respect to the center and deepest point of said countersink to thereby produce the desired prism in the segment vision field.

3. A fused multifocal lens blank comprising a main blank portion of one index of refraction having an optically-prepared surface of continuous curvature formed thereon, and a composite button comprising a segment of glass of a second index of refraction, and a second segment of glass of a third index of refraction embedded in said first-named segment so as to provide a shoulder therearound, said button having a complemental optically-prepared surface of continuous curvature on one of its surfaces throughout its entire area, said composite button being fused on the optically-prepared surface of the main blank portion to locate the optical axis of said button at the predetermined desired angle relative to the optical axis of the major blank portion.

4. A fused trifocal lens blank comprising a main blank portion of one index of refraction having a countersink of continuous curvature formed therein, and a composite button comprising a segment of glass of a second index of refraction and a second segment of glass of a third index of refraction embedded in said first-named segment so as to provide a shoulder therearound, said button having a complemental surface of continuous curvature on one of its surfaces throughout its entire area, said composite button being fused in said countersink to locate the optical center of the segment vision field in the finished lens which corresponds to said second segment of glass laterally to one side of a vertical line passing through the center of said segment vision field.

JAMES H. HAMMON.